United States Patent
Gupta

(10) Patent No.: US 8,929,929 B2
(45) Date of Patent: Jan. 6, 2015

(54) SENDING INFORMATION DURING A CHARGING EVENT

(75) Inventor: Rajarshi Gupta, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 12/796,516

(22) Filed: Jun. 8, 2010

(65) Prior Publication Data

US 2010/0317379 A1    Dec. 16, 2010

Related U.S. Application Data

(60) Provisional application No. 61/186,284, filed on Jun. 11, 2009.

(51) Int. Cl.
*H04W 4/12* (2009.01)
*H04W 52/02* (2009.01)

(52) U.S. Cl.
CPC ...... *H04W 52/0261* (2013.01); *H04W 52/0258* (2013.01)
USPC .......................................... 455/466; 455/572

(58) Field of Classification Search
USPC .......................................... 455/572–574, 466
See application file for complete search history.

(56) References Cited

U.S. PATENT DOCUMENTS

| | | | |
|---|---|---|---|
| 5,870,685 A * | 2/1999 | Flynn | 455/573 |
| 6,229,990 B1 * | 5/2001 | Toshida | 455/69 |
| 6,697,617 B2 * | 2/2004 | Liebenow | 455/425 |
| 2005/0170827 A1 | 8/2005 | Nagashima | |
| 2007/0135082 A1 | 6/2007 | Erhart et al. | |
| 2008/0045277 A1 * | 2/2008 | Plestid et al. | 455/574 |
| 2009/0005098 A1 * | 1/2009 | McGowan et al. | 455/517 |

FOREIGN PATENT DOCUMENTS

| | | |
|---|---|---|
| CN | 1266345 A | 9/2000 |
| EP | 1032230 | 8/2000 |
| JP | 2005521336 A | 7/2005 |
| JP | 2005222171 A | 8/2005 |
| JP | 2009182764 A | 8/2009 |
| KR | 20000062588 | 10/2000 |
| KR | 20070036425 A | 4/2007 |
| WO | WO-03081882 A1 | 10/2003 |
| WO | WO2008045163 | 4/2008 |

OTHER PUBLICATIONS

International Search Report and Written Opinion—PCT/US2010/038435, International Search Authority—European Patent Office—Nov. 23, 2010.
Taiwan Search Report—TW099118912—TIPO—Jun. 25, 2013.

* cited by examiner

*Primary Examiner* — Chuong A Ngo

(57) ABSTRACT

A mobile device sends information during a charging event to mitigate potential adverse effects that may occur if the information is sent at other times. For example, after obtaining information, the mobile device may determine whether the information is time-critical. If the information is not time-critical, the mobile device may store the information. Then, once the mobile device determines that a charging event is occurring, the mobile device sends the stored information.

45 Claims, 11 Drawing Sheets

SENDING INFORMATION DURING A CHARGING EVENT

CLAIM OF PRIORITY

This application claims the benefit of and priority to commonly owned U.S. Provisional Patent Application No. 61/186,284, filed Jun. 11, 2009, the disclosure of which is hereby incorporated by reference herein.

BACKGROUND

1. Field

This application relates generally to electronic communication and more specifically, but not exclusively, to controlling the sending of information.

2. Introduction

A wireless communication network may be deployed over a defined geographical area to provide various types of services (e.g., voice, data, multimedia services, etc.) to users within that geographical area. In a typical implementation, access points (e.g., corresponding to different cells) are distributed throughout a network to provide wireless connectivity for mobile devices (e.g., access terminals such as cell phones) that are operating within the geographical area served by the network.

At various points in time, a mobile device may upload information to another entity (e.g., a network entity). For example, an access terminal will repeatedly send reports to its serving access point, whereby the reports identify nearby access points, indicate the status of the access terminal, and so on. Uploads such as these may, however, interfere with other operations of the access terminal. For example, an upload may consume communication medium resources and/or battery resources that otherwise may be used for calls and other user applications. Accordingly, a need exists for more efficient techniques for uploading information from a mobile device.

SUMMARY

A summary of sample aspects of the disclosure follows. In the discussion herein, a reference to the term aspects may refer to one or more aspects of the disclosure.

The disclosure relates in some aspects to sending information during a charging event. For example, after obtaining information that is to be sent to another entity, a mobile device may determine whether the information is time-critical (e.g., should be uploaded as soon as possible). If the information is not time-critical, the mobile device may store the information so that the information may be sent during a charging event. Accordingly, once it is determined that a charging event is occurring, the mobile device sends the stored information.

BRIEF DESCRIPTION OF THE DRAWINGS

These and other sample aspects of the disclosure will be described in the detailed description and the appended claims that follow, and in the accompanying drawings, wherein:

Figure 1:
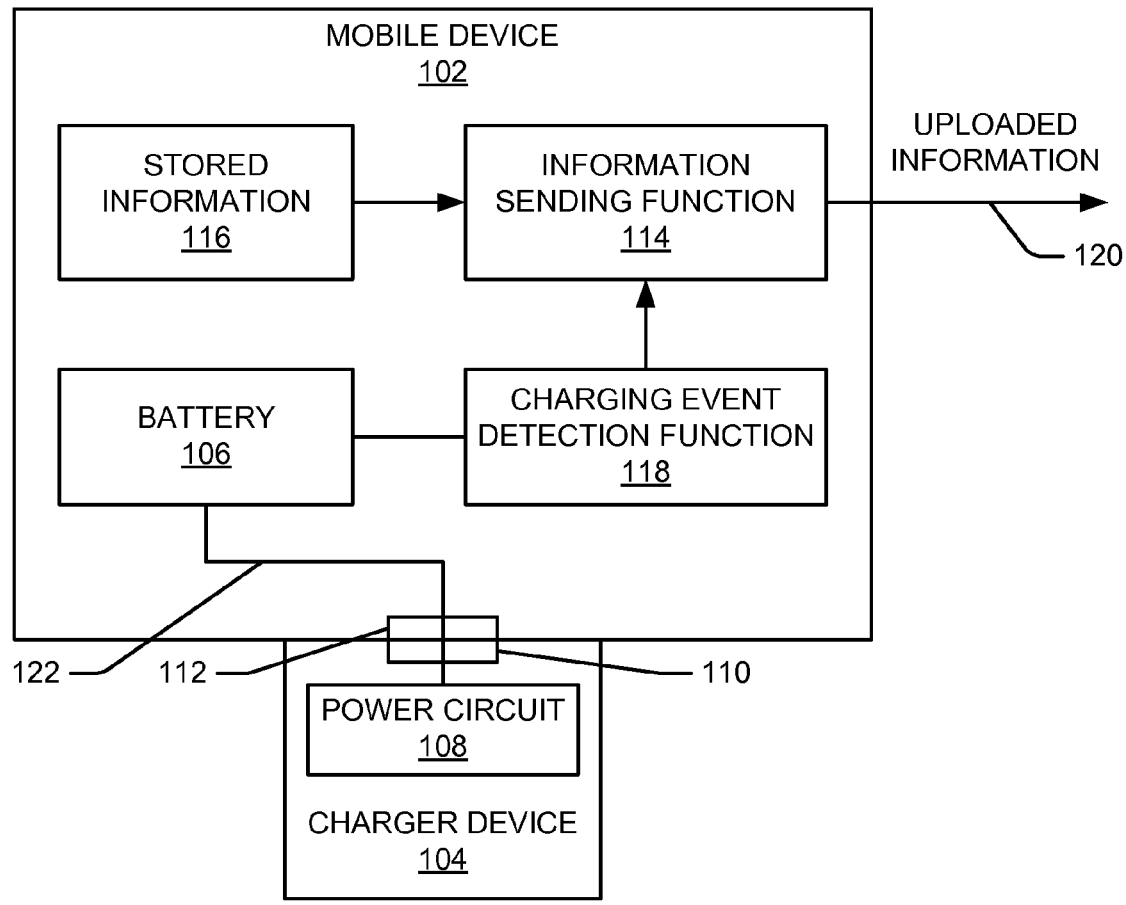
FIG. 1 is a simplified block diagram of several sample aspects of a mobile device coupled to a charger device and configured to send information during a charging event.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates a mobile device 102 that is connected to a charger device 104 to charge a battery 106 of the mobile device 102. Here, charge current from a power circuit 108 of the charger device 104 flows via a connection 122 through connectors 110 and 112 of the charger device 104 and the mobile device 102, respectively, to the battery 106.

The mobile device 102 includes an information sending function 114 that is configured to send stored information 116 during a charging event. To this end, a charging event detection function 118 determines when a charging event is occurring and sends a corresponding indication to the information sending function 114. Upon receipt of this indication, the information sending function 114 determines whether there is stored information to be sent and, if so, sends the information to the appropriate destination as represented by the uploaded information 120.

A charging event may be detected in various ways. For example, the mobile device 102 may detect whether charge current is flowing to the battery 106. As another example, the mobile device 102 may detect whether the mobile device is connected to the charger device 104. In addition, as discussed in more detail at FIG. 4 below, in some implementations the mobile device 102 may predict a charging event.

The mobile device 102 may take various forms. For example, in some implementations the mobile device may comprise an access terminal that is configured to access a network. Such an access terminal may comprise, for example, a cellular phone, a smart phone, a personal computer (e.g., laptop), a handheld communication device, a handheld computing device, a satellite radio, a global positioning system, a personal data assistant (PDA), a personal entertainment device (e.g., a music player, a video player, etc.), any other suitable device for communicating over a wireless communication system, or a combination of the above.

Sample operations that may be performed by a mobile device in conjunction with the teachings herein will now be described in more detail with reference to the flowchart of FIGS. 2-4. For convenience, the operations of FIGS. 2-4 (or any other operations discussed or taught herein) may be described as being performed by specific components (e.g., components as shown in FIGS. 1, 5, 6, and 9). It should be appreciated, however, that these operations may be performed by other types of components and may be performed using a different number of components. It also should be appreciated that one or more of the operations described herein may not be employed in a given implementation.

Figure 2:
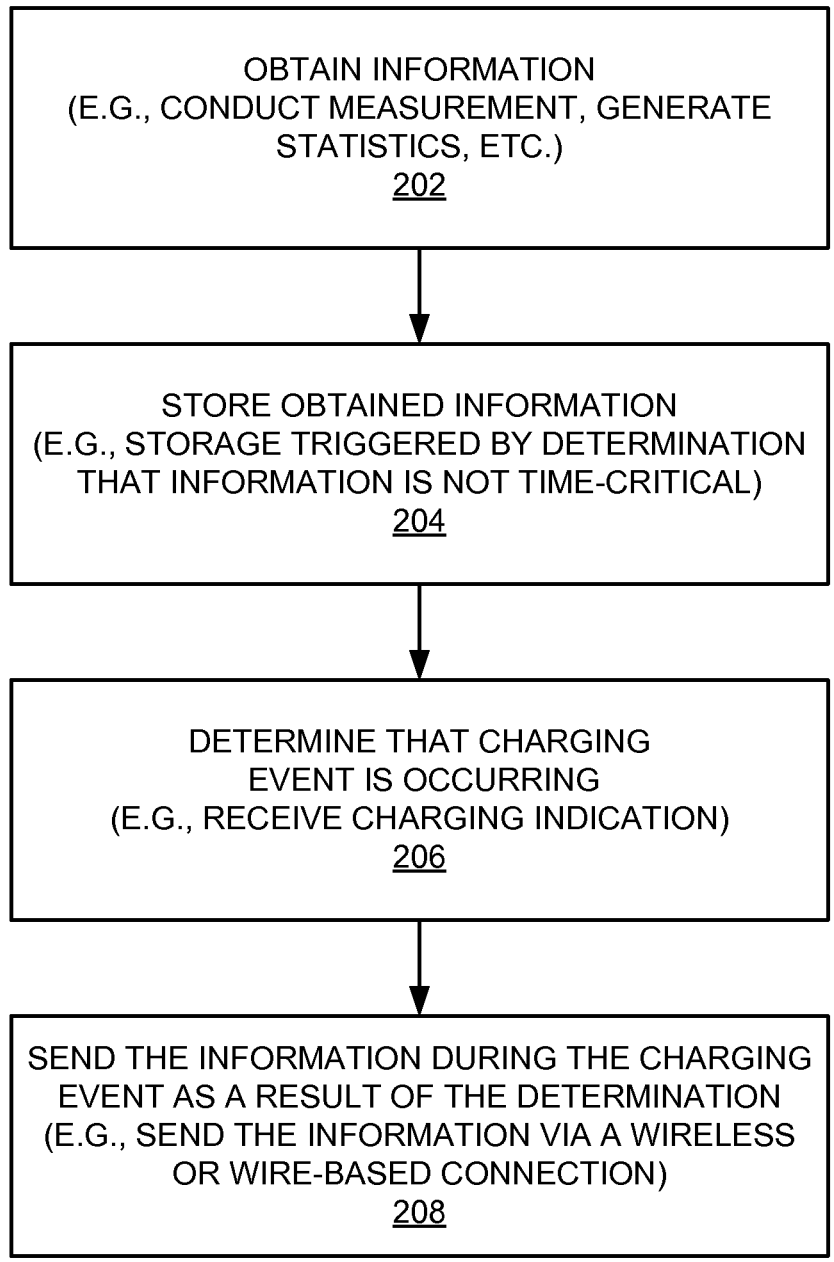
FIG. 2 is a flowchart of several sample aspects of operations that may be performed to send information during a charging event.
Figure 3:
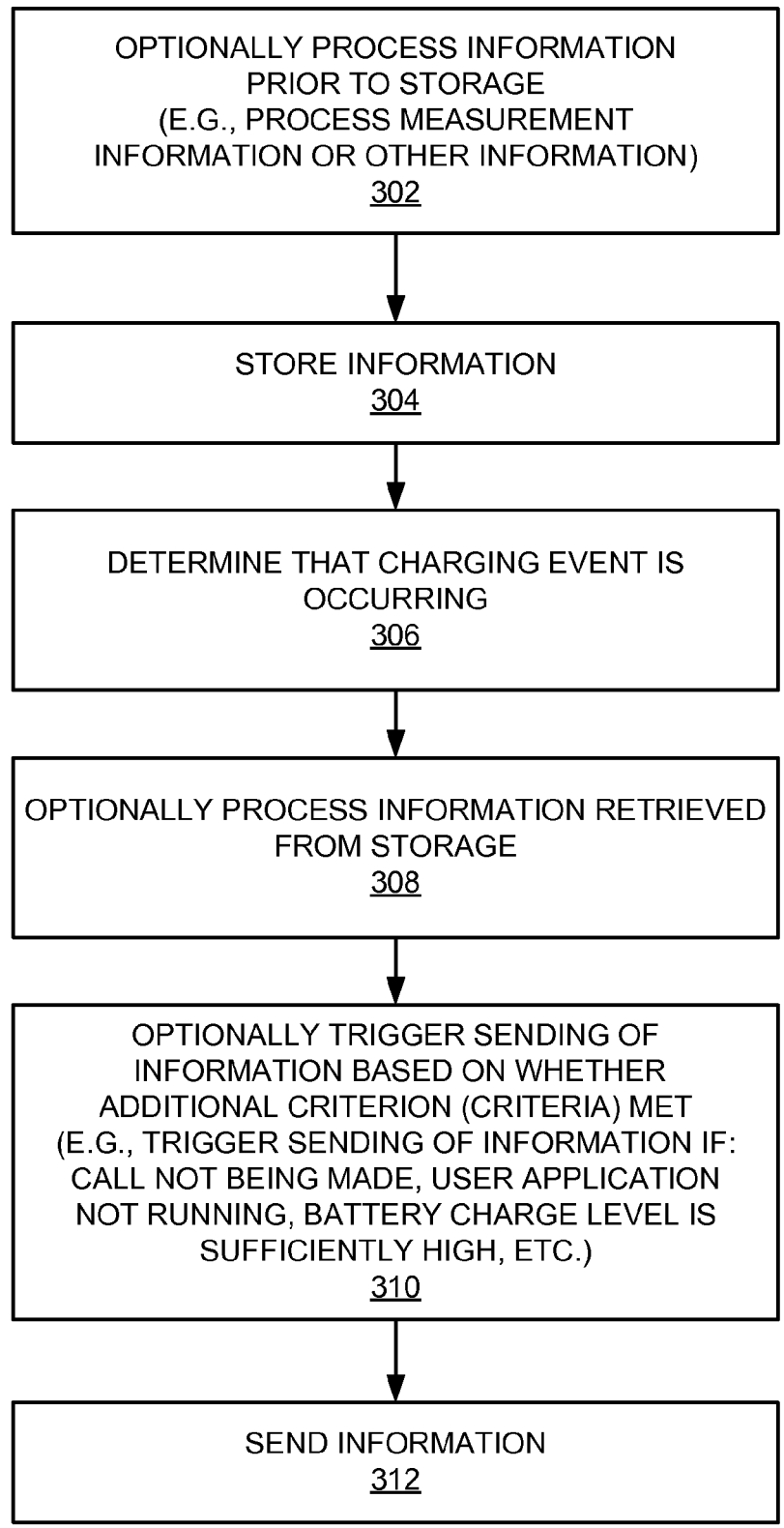
FIG. 3 is a flowchart of several sample aspects of additional operations that may be performed to send information during a charging event.

Referring initially to FIG. 2, as represented by block 202, a mobile device obtains information that needs to be sent to another entity. For example, the mobile device may conduct measurements, generate statistics, or obtain information in some other manner at certain points in time or over a period of time.

In some implementations a mobile device conducts radiofrequency (RF) signal measurements. For example, a mobile device may use repeatedly (e.g., periodically) scan for RF signals in an attempt to identify any access points operating in the vicinity of the mobile device. In some implementations, the measurements comprise routine radio resource control (RRC) measurements. A measurement report generated by a mobile device also may comprise other information such as a channel quality indicator (CQI) that provides an indication to upper layers.

In some implementations a mobile device conducts measurements through the use of one or more sensors of the mobile device. For example, a mobile device may measure its current location through the use of global positioning system (GPS) sensors.

In some implementations, a mobile device generates statistics based on information available to the mobile device. For example, a mobile device may generate call statistics based on calls made or received by the mobile device. A mobile device may generate statistics based on handovers of the mobile device from one access point to another. A mobile device also may generate statistics based on measurements conducted by the mobile device.

Information (e.g., measurements) may be classified into different categories (e.g., based on respective priorities). For example, different classes of information obtained by a mobile device may facilitate different time-critical tasks executed in a network. Here, some classes of information may need to be reported in real-time (e.g., to enable the network to take immediate action), while other classes of information may not need to be reported in real-time.

In some aspects, information that needs to be reported in real-time (e.g., as soon as possible) may be classified as time-critical information. For example, it may be desirable to immediately report information that indicates that a mobile device has dropped a call or is experiencing radio link failure (RLF). As another example, it may be desirable to report without significant delay any information acquired by a mobile device that may be used by a serving cell to identify a neighboring cell for handover of the mobile device.

Conversely, information that does not need to be reported immediately may be classified as non-time-critical information. For example, it may not be necessary to immediately report some types of call statistics (e.g., this information may be reported once a day).

In accordance with the teachings herein, a mobile device reports information in a manner that mitigates potentially adverse effects such reporting may have on other functions (e.g., more critical functions) of the mobile device. For example, information that is time-critical may be sent as soon as possible, while information that is not time-critical is stored and sent at a more opportune time. As discussed herein, this information may be sent during a charging event. In this way, non-time-critical information may be sent without adversely affecting (e.g., interfering with) one or more of: active calls, user applications, or battery life. For example, in many instances a user will not be making a call when the mobile device is being charged (e.g., while connected to a charger device), however, the mobile device may still have network connectivity at this time. In addition, in many instances a user will not be running user applications when the mobile device is being charged. Also, since the mobile device is connected to a power source during charging, sending information at this time generally will not affect the battery life (e.g., the device run-time while operating on batter power) once charging is complete.

Accordingly, as represented by block 204 of FIG. 2, the mobile device may store the information obtained at block 202 in a memory (e.g., a memory device) of the mobile device. As discussed above, the storage of the obtained information may be triggered by a determination that the obtained information is non-time-critical.

As represented by block 206, at some point in time, the mobile device determines that a charging event is occurring. For example, in some implementations the mobile device includes a battery circuit that provides a charging indication (e.g., to a processor of the mobile device) via a signal or via the setting of a value in a register.

As represented by block 208, as a result of the determination of block 206, the mobile device sends the stored information to the appropriate destination. As discussed in more detail below at FIGS. 5 and 6, the information may be sent via a wireless connection, a wire-based connection, or some other suitable connection to a network entity or some other entity.

Charging event-based sending of information may involve different operations in different implementations. For purposes of illustration, FIG. 3 illustrates several optional operations that may be employed in conjunction with the operations of FIG. 2.

As represented by block 302, information to be sent during a charging event may be processed before it is stored. As an example, measurement information (e.g., information obtained from a sensor or an RF receiver) may be processed before it is stored. As another example, processing of information is involved in the generation of statistical information that may be stored.

Blocks 304 and 306 involve storing the information and subsequently determining that a charging event is occurring. Thus, these blocks correspond to blocks 204 and 206 of FIG. 2.

As represented by block 308, information to be sent during a charging event may be processed after it is retrieved from storage. For example, information retrieved from memory may be processed to generate statistical information to be sent to a designated destination.

As represented by block 310, the mobile device may employ an additional criterion (or additional criteria) for triggering the sending of stored information. An additional criterion may be employed, for example, to provide further assurance that the sending of stored information does not interfere with other functions of the mobile device. For example, sending of stored information (at block 312) may be triggered if a charging event is occurring (as detected at block 306) and if one or more of the following are true: 1) a call is not currently being made on the mobile device; 2) one or more specified user applications are not running on the mobile device; 3) the charge level of the battery is sufficiently high (e.g., above a threshold level). Another criterion or other criteria may be employed in other cases.

In some implementations, a mobile device may monitor user behavior and use this information to determine when to send information. For example, the mobile device may keep track of prior user behavior and use this historical information to recognize opportune moments for sending stored information. In some implementations, these operations may be performed by an artificial intelligence component of the mobile device. Such a component may learn, based on various factors such as patterns of user behavior or network communications, about different opportune moments that become available for transmission of non-time-critical information. As a specific example, if the mobile device is charged at regular time intervals, information relating to such time periods may be stored and used by the mobile device to trigger the sending of information (e.g., transmitting the measurement reports). As another example, if the mobile device is regularly charged under certain conditions (e.g., when the battery indicator indicates particular level, such as one out of four bars), information relating to such conditions may be stored and used by the mobile device to trigger the sending of information. Thus, the mobile device may employ tracked user behavior to predict occurrence of opportune moments for sending non-time-critical information. Additionally, such predictions may be employed in combination with other factors to facilitate the decision of when to send the information. As a means of illustration and not limitation, other factors may comprise, power levels currently available versus power required to transmit the non-time-critical data.

Figure 4:
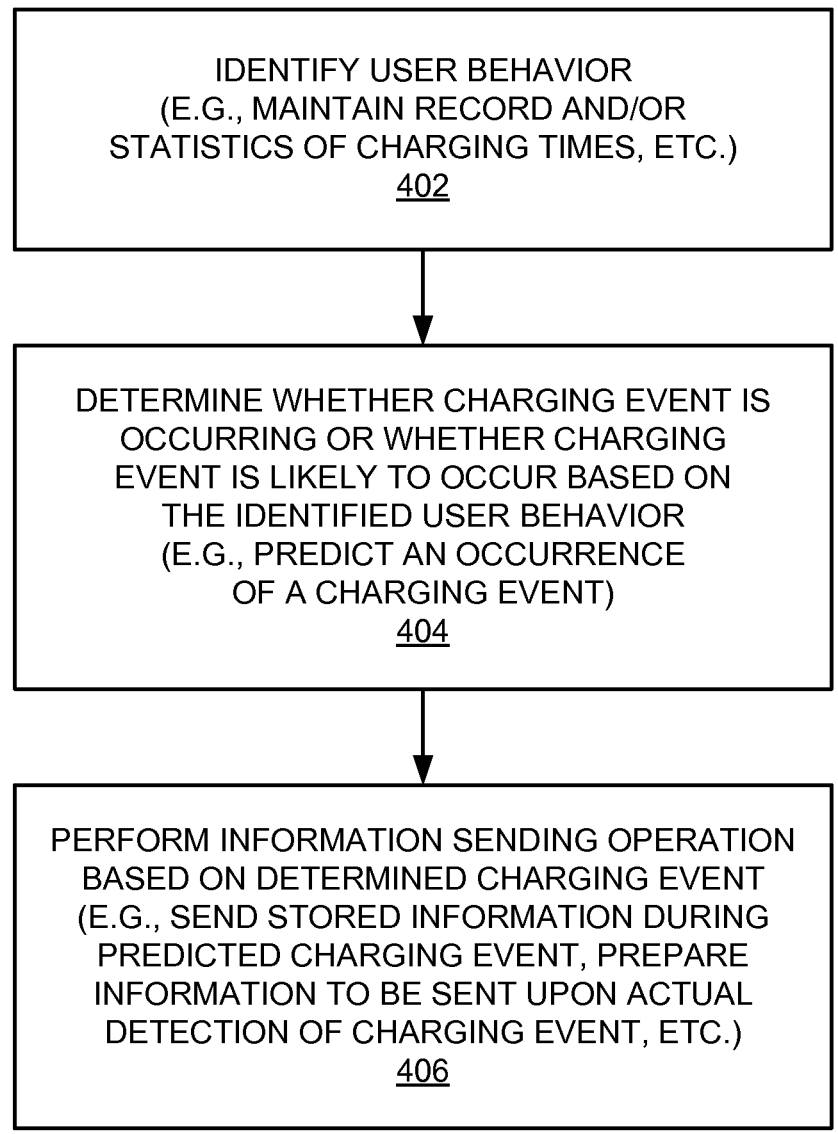
FIG. 4 is a flowchart of several sample aspects of operations that may be performed to send information based on user behavior.

FIG. 4 depicts sample user behavior-related operations that may be performed by a mobile device. As represented by block 402, at various points in time a mobile device identifies user behavior. For example, the mobile device may maintain a record and/or maintain statistics that indicate when the mobile device is being charged (e.g., that indicate when the user has connected the mobile device to a charger device). Thus, such a record or statistics may relate to previous charging times.

As represented by block 404, at some later point in time, the mobile device may determine whether a charging event is occurring (or whether a charging event is likely to occur) based on the identified user behavior (e.g., based on the maintained record and/or statistics). Thus, in some aspects, the mobile device may predict the occurrence of a charging event.

As represented by block 406, the mobile device may then perform an operation relating to the sending of information based on the determination of block 404. For example, the mobile device may send stored information during a predicted charging event (e.g., at a time that corresponds to prior charging times). As another example, in preparation for a predicted charging event, the mobile device may prepare information to be sent. Then, once an actual charging event is detected, the mobile device may send the prepared information.

Figure 5:
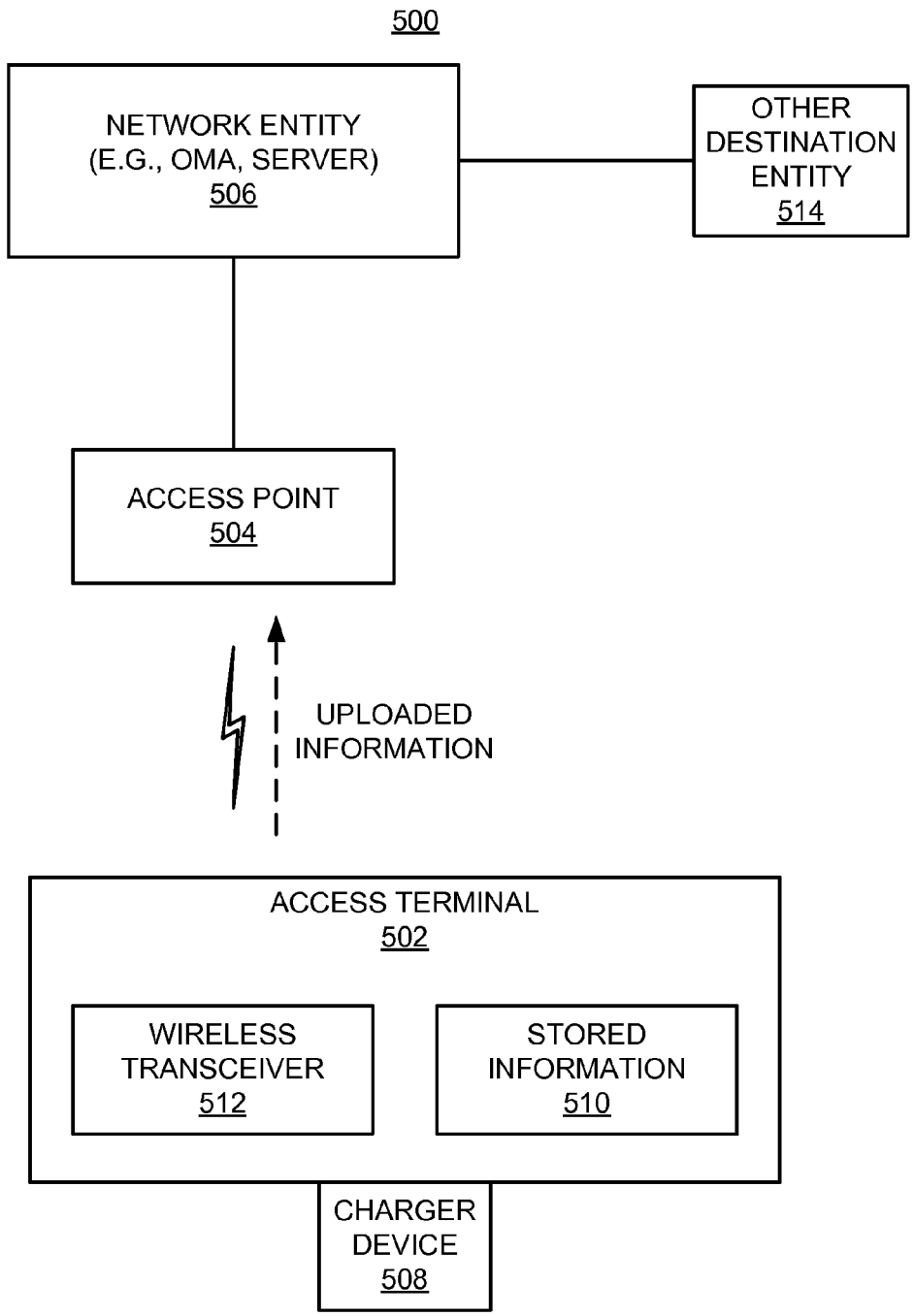
FIG. 5 is a simplified block diagram of several sample aspects of a network communication system where a mobile device coupled to a charger device sends information to the network during a charging event.
Figure 6:
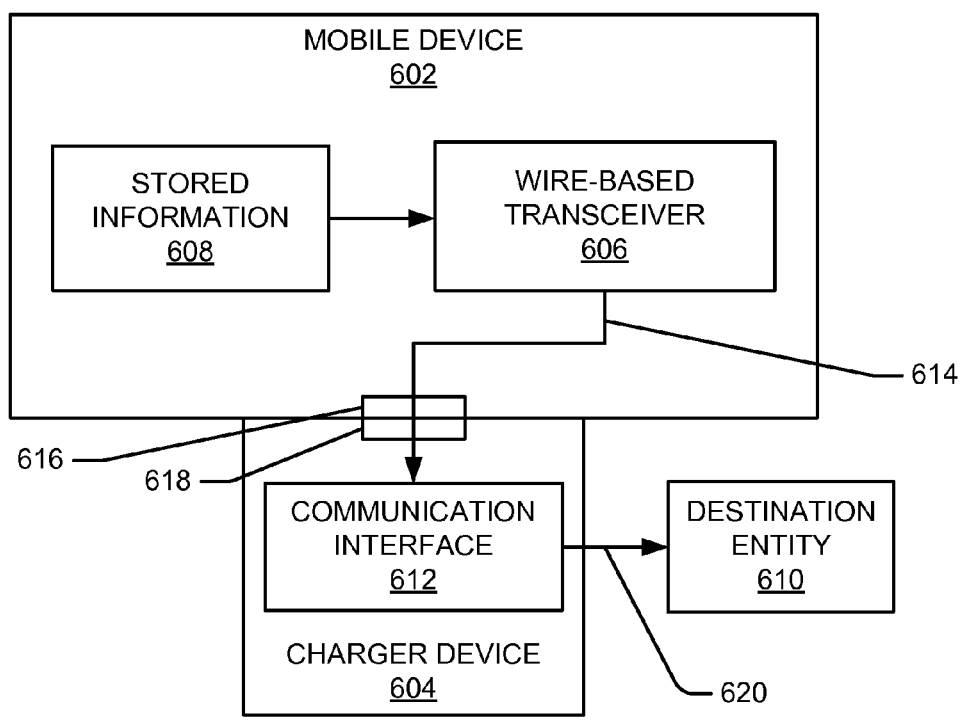
FIG. 6 is a simplified block diagram of several sample aspects of a communication system where a mobile device coupled to a charger device sends information during a charging event to another entity via the charger device.

A mobile device may send information to various entities and may send this information in various ways. FIGS. 5 and 6 describe examples where mobile devices send information via a wireless medium and a wire-based medium, respectively.

FIG. 5 illustrates several nodes of a sample communication system 500 (e.g., a portion of a communication network). For illustration purposes, various aspects of FIG. 5 will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations or eNodeBs, access terminals may be referred to or implemented as user equipment or mobiles, and so on.

Access points in the system 500 provide one or more services (e.g., network connectivity) for one or more wireless terminals (e.g., access terminal 502) that may be installed within or that may roam throughout a coverage area of the system 500. For example, at various points in time the access terminal 502 may connect to an access point 504 or some other access point in the system 500 (not shown). Each of the access points may communicate with one or more network entities (represented, for convenience, by network entity 506) to facilitate wide area network connectivity. A network node may take various forms such as, for example, one or more radio and/or core network entities. Thus, in various implementations the network entity 506 may represent functionality such as at least one of: network management (e.g., via an operations, administrations, and maintenance (OAM) entity, or a secure user plane location (SUPL) server), call control, session management, mobility management, gateway functions, interworking functions, or some other suitable network functionality.

In accordance with the teachings herein, the access terminal 502 may connect to a charger device 508 and detect a charging event. Upon detecting this event, the access terminal 502 (by operation of a wireless transceiver 512) transmits stored information 510 to its serving access point (e.g., access point 504) for delivery to an appropriate destination. The wireless transceiver 512 includes a transmitter chain and a receiver chain (not shown), each of which may, in turn, comprise a plurality of components associated with signal transmission and reception (e.g., processors, modulators, multiplexers, demodulators, demultiplexers, antennas, etc.), as will be appreciated by one skilled in the art. For convenience, other components of the access terminal 502 and the charger device 508 (e.g., as shown in FIG. 1) are not shown in FIG. 5.

The destination may be a network entity or another destination entity 514 to which the network forwards the information. In some cases, the destination may be an OAM entity. For example, the stored information may comprise measurement information that is regularly uploaded to the OAM entity. In other cases, the destination may be a network configuration server, a network management server, a crowd-sourcing server (e.g., represented by entity 514), or some other suitable entity.

FIG. 6 illustrates a system 600 where a mobile device 602 sends information via a wire-based connection. Here, upon connecting to a charger device 604 and detecting a charging event, a wire-based transceiver 606 of the mobile device 602 sends stored information 608 to a destination entity 610 via a connection established through the charger device 604. In this case, the wire-based transceiver 606 is coupled to a communication interface 612 of the charger device 604 via a communication path 614 that passes through the connectors 616 and 618. The communication interface 612, in turn, communicates with the destination entity 610 (e.g., a network entity or non-network entity) via a suitable communication path 620.

Figure 7:
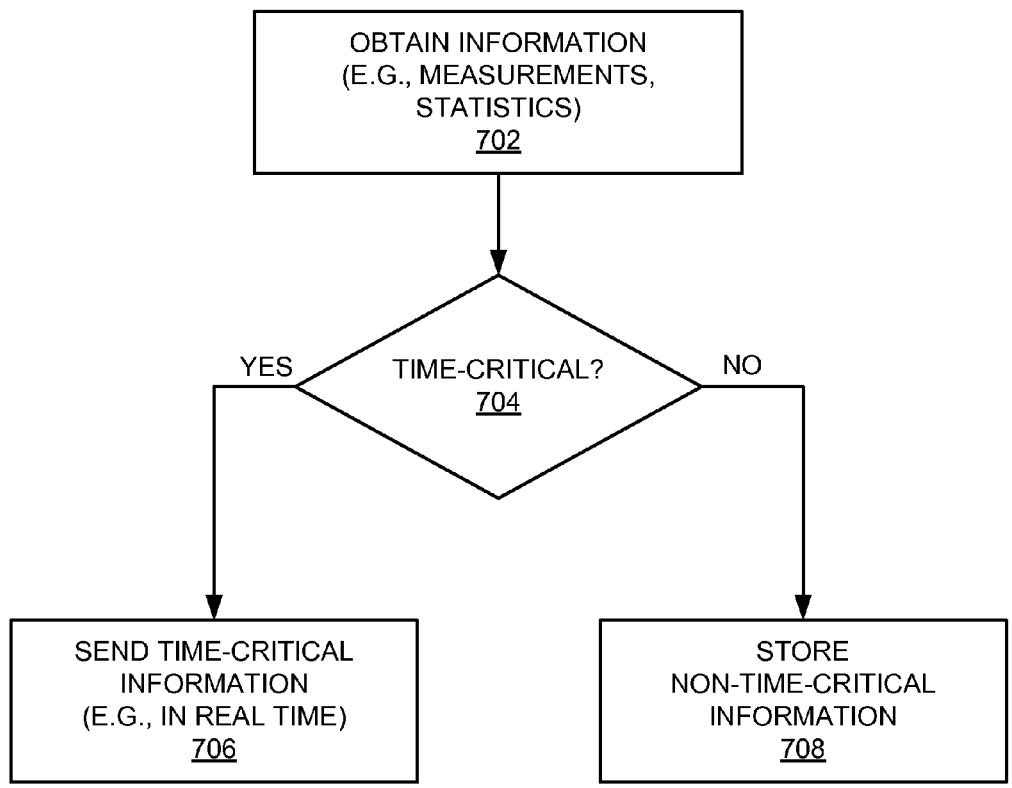
FIG. 7 is a flowchart of several sample aspects of operations that may be performed to handle time-critical and non-time-critical information.

FIG. 7 provides additional details relating to how a mobile device may manage different types (e.g., different classes) of information to facilitate sending information at opportune instances to mitigate potential interference that may be caused by the sending of the information. The method begins at block 702 where the mobile device obtains information (e.g., measurements for various attributes, statistics, etc.). At block 704, the mobile device determines what type of information has been obtained. As discussed herein, some obtained information may be time-critical (e.g., required by the network immediately) that should be reported in real-time. Conversely, some of the information may not be time-critical and does not need to be reported in real-time. Accordingly, among the information collected at block 702, information to be sent in real-time is identified as shown at block 704. Information required by the network in real-time may thus be sent immediately as shown at block 706 (e.g., sent without waiting for an occurrence of a charging event). In contrast, non-time-critical information identified at block 704 (e.g., not currently required by the network) is stored for sending at a later, more opportune time instance as shown at block 708. Thus, power consumption and use of bandwidth resources associated with sending this information is delayed until a later point in time.

Figure 8:
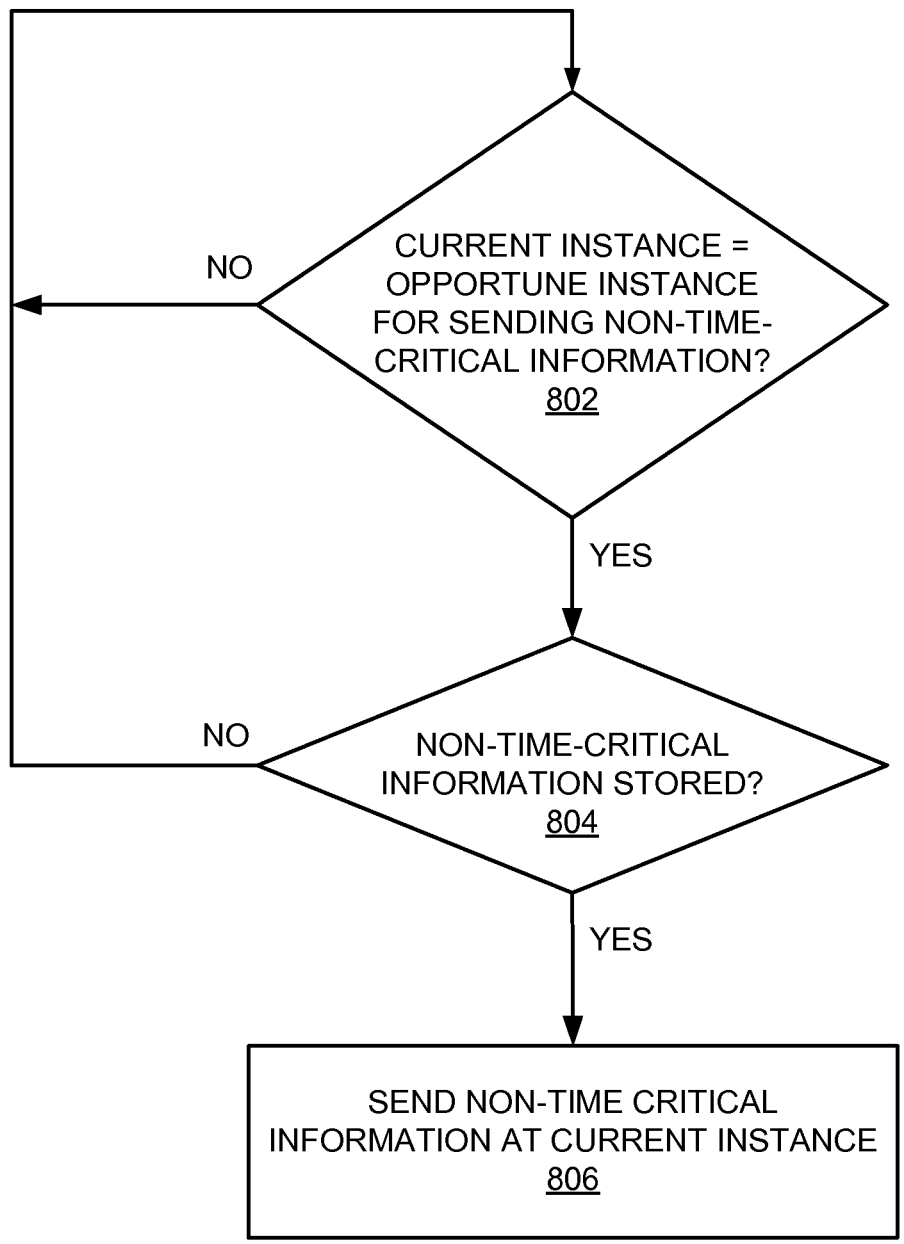
FIG. 8 is a flowchart of several sample aspects of operations that may be performed to send non-time-critical information.

FIG. 8 describes an example of how a mobile device may determine an opportune instance for sending stored information. At block 802, the mobile device determines if the current instance is an opportune instance for sending stored information. As discussed herein, an artificial intelligence component of the mobile device may identify different opportune moments based on patterns of user behavior or network communications, or other historical information. For example, it may be determined that a mobile device is usually charged for a considerable period of time while generally maintaining network connectivity. Moreover, it may be determined that the mobile device is normally not in use and therefore is not transmitting user data during charging instances. Hence, it may be determined that the mobile device has significant bandwidth (e.g., all of the bandwidth) available for sending information and has unlimited power supply during these charging instances. Therefore, charging instances may be identified as one of the opportune moments for sending non-time-critical measurements (e.g., transmitting measurement reports). If, at block 802, it is determined that the current instance is an opportune instance for sending non-time-critical information, the information is sent as shown at block 806. If the current instance is not an opportune time period for sending the non-time-critical information, the method returns to block 802, whereby the non-time-critical information remains stored for sending at a later time.

Figure 9:
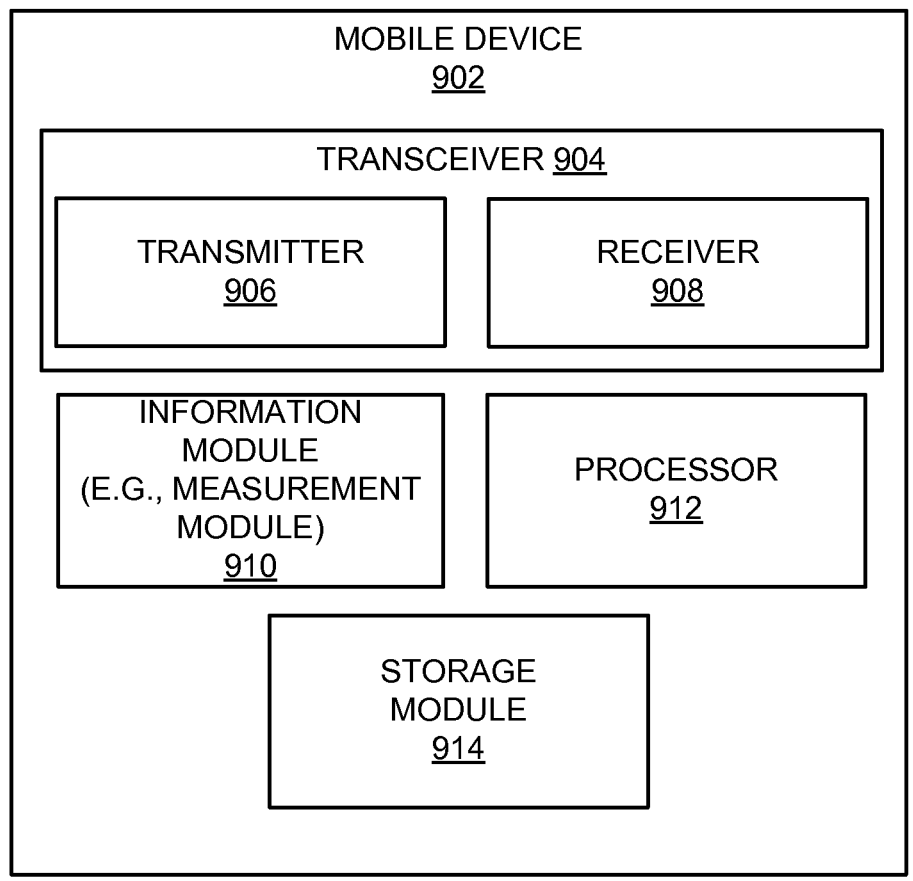
FIG. 9 is a simplified block diagram of several sample aspects of components that may be employed in communication nodes.

FIG. 9 illustrates several sample components that may be incorporated into a mobile device to perform information sending operations as taught herein. In practice, the described components also may be incorporated into other nodes in a communication system. For example, other nodes in a system may include components similar to those described for the mobile device 902 to provide similar functionality. Also, a given node may contain one or more of the described components. For example, a mobile device may contain multiple transceiver components that enable the mobile device to operate on multiple frequencies and/or communicate via different technologies.

As shown in FIG. 9, the mobile device 902 includes a transceiver 904 for communicating with other nodes. The transceiver 904 includes a transmitter 906 for sending signals (e.g., transmitting stored information) and a receiver 908 for receiving signals. As a specific example, an access terminal may comprise such transmission and receiving components for facilitating communication on forward and reverse links.

The mobile device 902 also includes other components that may be used in conjunction with information sending operations as taught herein. For example, the mobile device 902 includes a storage module 914 for storing information. The storage module 914 may comprise, for example, a memory device in the mobile device, a memory component of an integrated circuit (e.g., a processor), or some other type of memory.

The mobile device 902 includes an information module 910 for obtaining information (e.g., conducting measurements, processing measured information, generating statistics) and for providing other related functionality as taught herein. In some aspects, the information module 910 may comprise a measurement module for facilitating measurement of various attributes associated with the mobile device. As a means of illustration and not limitation, a measurement component may be a sensor that is used to measure the current location of the mobile device.

The mobile device 902 includes a processor 912 for providing processing functionality and for providing other related functionality as taught herein. For example, the processor 912 may be used for one or more of: determining that a charging event is occurring, processing stored information, identifying user behavior, determining whether information is time-critical, or determining whether to transmit information.

In some aspects, the processor 912 may be used to facilitate the measurement of different attributes. Although the information module 910 and the processor 912 are shown as separate components, a single entity may be employed to execute different tasks associated with measuring attributes in addition to other processing tasks. For example, certain attributes may be derived by the processor 912 from existing information without requiring explicit measurements. Additionally, the processor 912 may generate measurement reports and/or messages that comprise information obtained from the information module 910. The processor 912 also may determine opportune moments to transmit information. For example, the processor 912 may recognize charging instances as opportune time periods for transmitting information. Thus, upon obtaining information (e.g., composing a measurement report), if the processor 912 recognizes a current instance as an opportune moment for transmission of the information, the transmitter 906 may be employed to transmit non-time-critical information (e.g., via an uplink to an access point) and, if available, time-critical information. However, if the current instance is not an ideal time for transmission of information, time-critical information required in real-time by the network is transmitted while the non-time-critical information is stored in the storage module 914 for transmission at a later time.

As discussed above, the mobile device may comprise an artificial intelligence (AI) component (not shown) for recognizing opportune moments for transmission of the information. In different implementations, the AI component may be implemented either within the processor 912 or separate from the processor 912.

In some implementations, the components of FIG. 9 may be implemented in one or more processors (e.g., that uses and/or incorporates data memory for storing information or code used by the processor(s) to provide this functionality). For example, some or all of the functionality of blocks 906-914 may be implemented by a processor or processors of a mobile device and data memory of the mobile device (e.g., by execution of appropriate code and/or by appropriate configuration of processor components).

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 10:
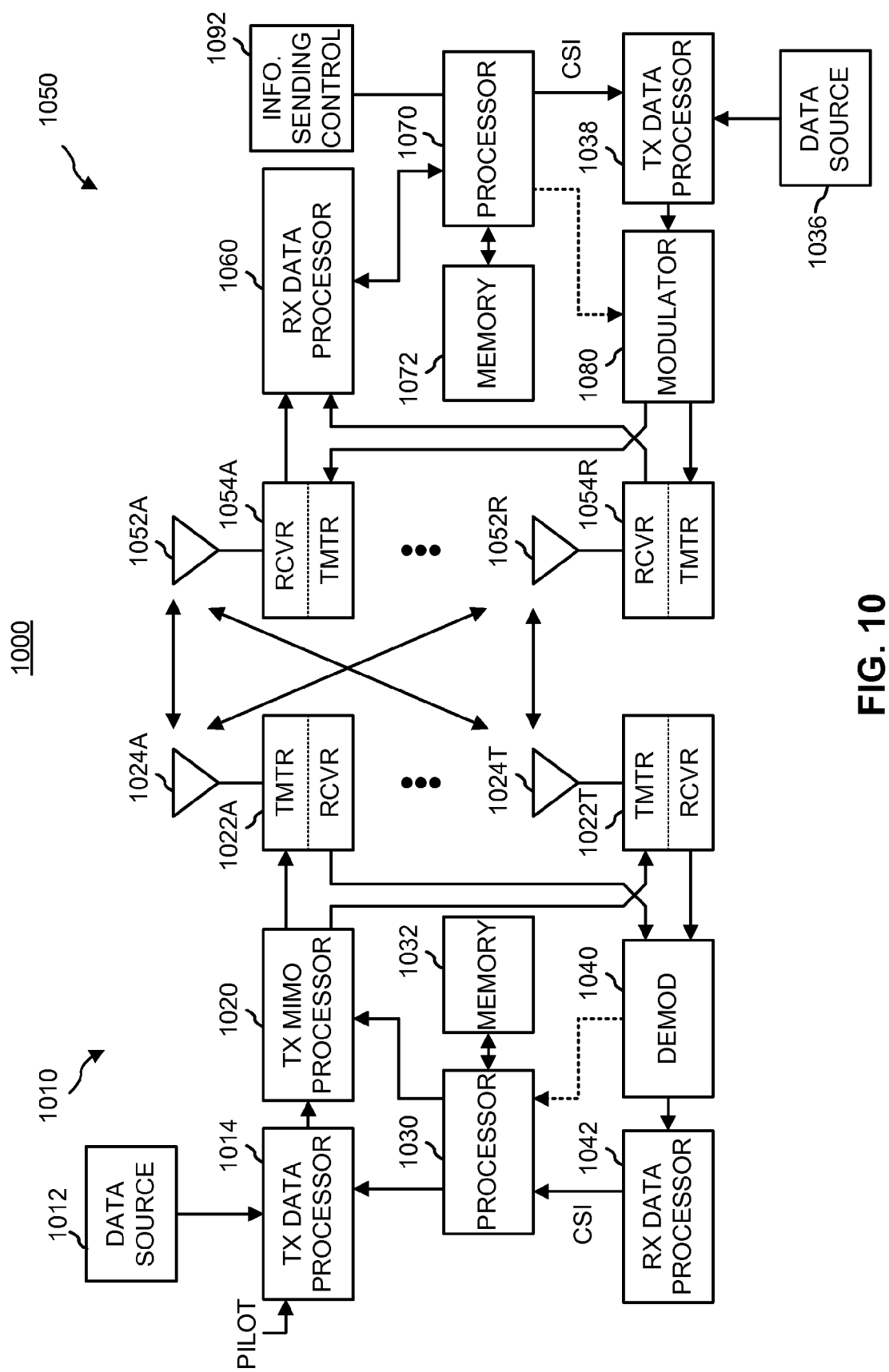
FIG. 10 is a simplified block diagram of several sample aspects of communication components.

FIG. 10 illustrates a wireless device 1010 (e.g., an access point) and a wireless device 1050 (e.g., an access terminal) of a sample MIMO system 1000. At the device 1010, traffic data for a number of data streams is provided from a data source 1012 to a transmit (TX) data processor 1014. Each data stream may then be transmitted over a respective transmit antenna.

The TX data processor 1014 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by a processor 1030. A data memory 1032 may store program code, data, and other information used by the processor 1030 or other components of the device 1010.

The modulation symbols for all data streams are then provided to a TX MIMO processor 1020, which may further process the modulation symbols (e.g., for OFDM). The TX MIMO processor 1020 then provides $N_T$ modulation symbol streams to $N_T$ transceivers (XCVR) 1022A through 1022T. In some aspects, the TX MIMO processor 1020 applies beam-forming weights to the symbols of the data streams and to the antenna from which the symbol is being transmitted.

Each transceiver 1022 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1022A through 1022T are then transmitted from $N_T$ antennas 1024A through 1024T, respectively.

At the device 1050, the transmitted modulated signals are received by $N_R$ antennas 1052A through 1052R and the received signal from each antenna 1052 is provided to a respective transceiver (XCVR) 1054A through 1054R. Each transceiver 1054 conditions (e.g., filters, amplifies, and downconverts) a respective received signal, digitizes the conditioned signal to provide samples, and further processes the samples to provide a corresponding "received" symbol stream.

A receive (RX) data processor 1060 then receives and processes the $N_R$ received symbol streams from $N_R$ transceivers 1054 based on a particular receiver processing technique to provide $N_T$ "detected" symbol streams. The RX data processor 1060 then demodulates, deinterleaves, and decodes each detected symbol stream to recover the traffic data for the data stream. The processing by the RX data processor 1060 is complementary to that performed by the TX MIMO processor 1020 and the TX data processor 1014 at the device 1010.

A processor 1070 periodically determines which pre-coding matrix to use (discussed below). The processor 1070 formulates a reverse link message comprising a matrix index portion and a rank value portion. A data memory 1072 may store program code, data, and other information used by the processor 1070 or other components of the device 1050.

The reverse link message may comprise various types of information regarding the communication link and/or the received data stream. The reverse link message is then processed by a TX data processor 1038, which also receives traffic data for a number of data streams from a data source 1036, modulated by a modulator 1080, conditioned by the transceivers 1054A through 1054R, and transmitted back to the device 1010.

At the device 1010, the modulated signals from the device 1050 are received by the antennas 1024, conditioned by the transceivers 1022, demodulated by a demodulator (DEMOD) 1040, and processed by a RX data processor 1042 to extract the reverse link message transmitted by the device 1050. The processor 1030 then determines which pre-coding matrix to use for determining the beam-forming weights then processes the extracted message.

FIG. 10 also illustrates that the communication components may include one or more components that perform information sending control operations as taught herein. For example, an information (INFO.) sending control component 1092 may cooperate with the processor 1070 and/or other components of the device 1050 to send information to another device (e.g., device 1010). It should be appreciated that for each device 1010 and 1050 the functionality of two or more of the described components may be provided by a single component. For example, a single processing component may provide the functionality of the information sending control component 1092 and the processor 1070.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

The teachings herein may be incorporated into (e.g., implemented within or performed by) a variety of apparatuses (e.g., nodes). In some aspects, a node (e.g., a mobile device) implemented in accordance with the teachings herein may comprise an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point as described herein may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a mobile device may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A mobile device may communicate via one or more wireless communication links that are based on or otherwise support any suitable wireless communication technology. For example, in some aspects a mobile device may associate with a network. In some aspects the network may comprise a local area network or a wide area network. A mobile device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a mobile device may support or otherwise use one or more of a variety of corresponding modulation or multiplexing schemes. A mobile device may thus include appropriate components (e.g., air interfaces) to establish and communicate via one or more wireless communication links using the above or other wireless communication technologies. For example, a mobile device may comprise a wireless transceiver with associated transmitter and receiver components that may include various components (e.g., signal generators and signal processors) that facilitate communication over a wireless medium.

Figure 11:
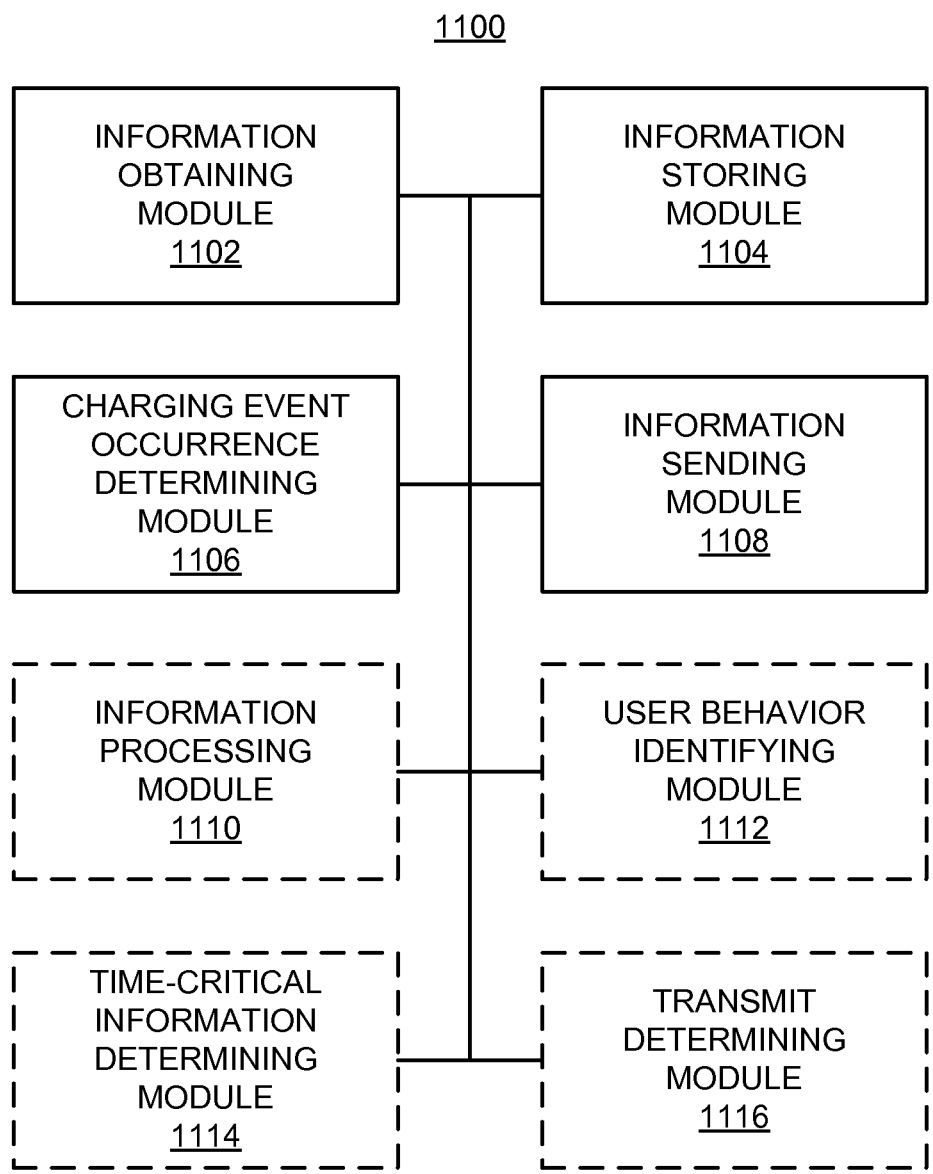
FIG. 11 is a simplified block diagram of several sample aspects of an apparatus configured to perform information sending operations as taught herein.

The functionality described herein (e.g., with regard to one or more of the accompanying figures) may correspond in some aspects to similarly designated "means for" functionality in the appended claims. Referring to FIG. 11, an apparatus 1100 is represented as a series of interrelated functional modules. Here, an information obtaining module 1102 may correspond at least in some aspects to, for example, an information module as discussed herein. An information storing module 1104 may correspond at least in some aspects to, for example, a storage module as discussed herein. A charging event occurrence determining module 1106 may correspond at least in some aspects to, for example, a processor as discussed herein. An information sending module 1108 may correspond at least in some aspects to, for example, a transmitter as discussed herein. An information processing module 1110 may correspond at least in some aspects to, for example, a processor as discussed herein. A user behavior identifying module 1112 may correspond at least in some aspects to, for example, a processor as discussed herein. A time-critical information determining module 1114 may correspond at least in some aspects to, for example, a processor as discussed herein. A transmit determining module 1116 may correspond at least in some aspects to, for example, a processor as discussed herein.

The functionality of the modules of FIG. 11 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIG. 11 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication for a mobile device, comprising:
   obtaining information;
   determining whether the obtained information is time-critical information or non-time-critical information, the time critical information belonging to a first category of information that may cause adverse effects when transmitting the obtained information is delayed, and the non-time-critical information belonging to a second category of information that may not cause adverse effects when transmitting the obtained information is delayed;
   triggering storage of the obtained information in response to determining that the obtained information is non-time-critical information;
   detecting triggering of a charging event; and then
   sending the stored information during the charging event in response to detecting the triggering of the charging event.

2. The method of claim 1, wherein the obtaining of the information comprises conducting at least one measurement at the mobile device.

3. The method of claim 2, wherein the obtaining of the information further comprises processing measured information obtained from at least one measurement.

4. The method of claim 1, wherein the obtaining of the information comprises generating statistics at the mobile device.

5. The method of claim 4, wherein the statistics are based on measurements conducted by the mobile device.

6. The method of claim 4, wherein:
   the statistics relate to previous charging times; and
   the detection of the triggering of the charging event is based on the statistics.

7. The method of claim 1, further comprising processing the stored information, wherein the sending of the stored information comprises sending the processed information.

8. The method of claim 1, wherein the detecting the triggering of the charging event comprises receiving an indication that a battery is being charged.

9. The method of claim 1, further comprising identifying user behavior, wherein the detecting of the triggering of the charging event occurring is based on the identified user behavior.

10. The method of claim 9, wherein the detecting the triggering of the charging event comprises using the identified user behavior to predict the occurrence of the charging event.

11. The method of claim 1, wherein the detecting the triggering of the charging event comprises determining that a current time interval corresponds to a charging instance.

12. The method of claim 1, further comprising:
    obtaining other information;
    determining that the other information is time-critical information; and
    sending the other information without waiting for an occurrence of a charging event.

13. The method of claim 1, further comprising determining whether to send the stored information based on at least one of a group consisting of: whether a call is being made, whether a user application is running, and a battery charge level.

14. The method of claim 1, wherein the stored information is sent to an operations, administration, and maintenance entity, a network configuration server, a network management server, or a crowd sourcing server.

15. The method of claim 1, wherein the stored information is sent via a wireless connection or a wire-based connection.

16. An apparatus for mobile device communication, comprising:
    an information module configured to obtain information;
    a time-critical information determining module configured to determine whether the obtained information is time-critical information or non-time-critical information, the time critical information belonging to a first category of information that may cause adverse effects when transmitting the obtained information is delayed, and the non-time-critical information belonging to a second category of information that may not cause adverse effects when transmitting the obtained information is delayed;
    a storage module configured to store the non-time-critical information, the storage module triggering in response to the time-critical information determining module determining that the obtained information is non-time-critical information;
    a processor configured to detect triggering of a charging event; and
    a transmitter configured to send the stored information during the charging event in response to detecting the triggering of the charging event.

17. The apparatus of claim 16, wherein the obtaining of the information comprises conducting at least one measurement at the mobile device.

18. The apparatus of claim 16, wherein the obtaining of the information comprises generating statistics at the mobile device.

19. The apparatus of claim 18, wherein:
    the statistics relate to previous charging times; and
    the detection of the triggering of the charging event is based on the statistics.

20. The apparatus of claim 16, wherein:
    the processor is further configured to identify user behavior; and
    the detection of the triggering of the charging event is based on the identified user behavior.

21. The apparatus of claim 16, wherein the processor is further configured to determine whether to send the stored information based on at least one of a group consisting of: whether a call is being made, whether a user application is running, and a battery charge level.

22. An apparatus for mobile device communication, comprising:
    means for obtaining information;
    means for determining whether the obtained information is time-critical information or non-time-critical information, the time critical information belonging to a first category of information that may cause adverse effects when transmitting the obtained information is delayed, and the non-time-critical information belonging to a second category of information that may not cause adverse effects when transmitting the obtained information is delayed;
    means for triggering storage of the obtained information in response to determining that the obtained information is non-time-critical information;
    means for detecting triggering of a charging event; and
    means for then sending the stored information during the charging event in response to detecting the triggering of the charging event.

23. The apparatus of claim 22, wherein the obtaining of the information comprises conducting at least one measurement at the mobile device.

24. The apparatus of claim 22, wherein the obtaining of the information comprises generating statistics at the mobile device.

25. The apparatus of claim 24, wherein:
the statistics relate to previous charging times; and
the detection of the triggering of the charging event is occurring is based on the statistics.

26. The apparatus of claim 22, further comprising means for identifying user behavior, wherein the detecting of the triggering of the charging event is based on the identified user behavior.

27. The apparatus of claim 22, further comprising means for determining whether to send the stored information based on at least one of a group consisting of: whether a call is being made, whether a user application is running, and a battery charge level.

28. A computer-program product for mobile device communication, comprising:
a non-transitory computer-readable medium comprising code for causing a computer to:
obtain information;
determine whether the obtained information is time-critical information or non-time-critical information, the time critical information belonging to a first category of information that may cause adverse effects when transmitting the obtained information is delayed, and the non-time-critical information belonging to a second category of information that may not cause adverse effects when transmitting the obtained information is delayed;
trigger storage of the obtained information in response to determining that the obtained information is non-time-critical information;
detect triggering of a charging event; and then
send the stored information during the charging event in response to detecting the triggering of the charging event.

29. The computer-program product of claim 28, wherein the obtaining of the information comprises conducting at least one measurement at the mobile device.

30. The computer-program product of claim 28, wherein the obtaining of the information comprises generating statistics at the mobile device.

31. The computer-program product of claim 30, wherein:
the statistics relate to previous charging times; and
the detection of the triggering of the charging event is based on the statistics.

32. The computer-program product of claim 28, wherein:
the computer-readable medium further comprises code for causing the computer to identify user behavior; and
the detection of the triggering of the charging event is based on the identified user behavior.

33. The computer-program product of claim 28, wherein the computer-readable medium further comprises code for causing the computer to determine whether to send the stored information based on at least one of a group consisting of: whether a call is being made, whether a user application is running, and a battery charge level.

34. A method of communication for a mobile device, comprising:
obtaining information;
evaluating the obtained information to determine whether the obtained information is time critical information or non-time-critical information, the time critical information belonging to a first category of information that may cause adverse effects when transmitting the obtained information is delayed, and the non-time-critical information belonging to a second category of information that may not cause adverse effects when transmitting the obtained information is delayed;
classifying the obtained information as either time critical information or non-time critical in response to the evaluating;
triggering storage of the obtained information in response to determining that the obtained information is non-time-critical information;
detecting triggering of a charging event; and then
sending the stored information during the charging event in response to detecting the triggering of the charging event.

35. The method of claim 34, in which obtaining the information comprises conducting at least one measurement at the mobile device.

36. The method of claim 35, in which obtaining the information further comprises processing measured information obtained from the at least one measurement.

37. The method of claim 34, in which obtaining the information comprises generating statistics at the mobile device.

38. The method of claim 37, in which:
the statistics relate to previous charging times; and
the detection of the triggering of the charging event is based on the statistics.

39. The method of claim 34, further comprising processing the stored information, in which the sending of the stored information comprises sending the processed information.

40. The method of claim 34, in which the detecting the triggering of the charging event comprises receiving an indication that a battery is being charged.

41. The method of claim 34, further comprising identifying user behavior, in which the detecting the triggering of the charging event is based on the identified user behavior.

42. The method of claim 41, in which the detecting the triggering of the charging event comprises using the identified user behavior to predict the occurrence of the charging event.

43. The method of claim 34, further comprising:
obtaining other information;
determining that the other information is time-critical information; and
sending the other information without waiting for occurrence of the charging event.

44. The method of claim 34, further comprising determining whether to send the stored information based on whether a call is being placed, whether a user application is running, and/or a battery charge level.

45. The method of claim 34, in which the stored information is sent to an operations, administration, and maintenance entity, a network configuration server, a network management server, and/or a crowd sourcing server.

* * * * *